United States Patent
Toba et al.

(10) Patent No.: US 11,939,676 B2
(45) Date of Patent: Mar. 26, 2024

(54) HOT-DIPPED ZN—AL—MG-BASED PLATED STEEL

(71) Applicant: NIPPON STEEL CORPORATION, Tokyo (JP)

(72) Inventors: Tetsuya Toba, Tokyo (JP); Atsushi Morishita, Tokyo (JP); Yusuke Kohigashi, Tokyo (JP); Shinichi Yamaguchi, Tokyo (JP); Takuya Mitsunobu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/007,650

(22) PCT Filed: Mar. 19, 2021

(86) PCT No.: PCT/JP2021/011526
§ 371 (c)(1),
(2) Date: Dec. 1, 2022

(87) PCT Pub. No.: WO2021/250973
PCT Pub. Date: Dec. 16, 2021

(65) Prior Publication Data
US 2023/0235437 A1 Jul. 27, 2023

(30) Foreign Application Priority Data
Jun. 9, 2020 (JP) .................................. 2020-100073

(51) Int. Cl.
*C23C 2/06* (2006.01)
*B32B 15/01* (2006.01)
(Continued)

(52) U.S. Cl.
CPC .............. *C23C 2/06* (2013.01); *B32B 15/013* (2013.01); *C22C 18/04* (2013.01); *C23C 2/26* (2013.01); *C23C 2/29* (2022.08); *C23C 2/40* (2013.01)

(58) Field of Classification Search
CPC .......... C23C 2/06; B32B 15/013; C22C 18/04
(Continued)

(56) References Cited

U.S. PATENT DOCUMENTS

| 6,235,410 B1 | 5/2001 | Komatsu et al. |
| 6,465,114 B1 | 10/2002 | Honda et al. |

(Continued)

FOREIGN PATENT DOCUMENTS

| JP | 10-226865 A | 8/1998 |
| JP | 2000-104154 A | 4/2000 |

(Continued)

*Primary Examiner* — Katherine A Christy
(74) *Attorney, Agent, or Firm* — Renner, Otto, Boisselle & Sklar, LLP

(57) ABSTRACT

This hot-dip Zn—Al—Mg-based plated steel includes: a steel; and a plating layer formed on a surface of the steel, in which the plating layer contains, as an average composition, Mg: 1 to 10 mass %, Al: 4 to 22 mass %, and a remainder consisting of Zn and impurities, the plating layer includes an (Al—Zn mixed structure) in an area ratio of 10% to 70% in a cross section of the plating layer in a matrix of an (Al/Zn/MgZn$_2$ ternary eutectic structure), the (Al—Zn mixed structure) includes a first region that has a Zn concentration in a range of 75 mass % or more and less than 85 mass % and a second region that is present inside the first region and has a Zn concentration in a range of 67 mass % or more and less than 75 mass %, and an area ratio of the second region in the (Al—Zn mixed structure) in the cross section of the plating layer is more than 0% and 40% or less.

12 Claims, 1 Drawing Sheet

(51) Int. Cl.
    *C22C 18/04*     (2006.01)
    *C23C 2/26*     (2006.01)
    *C23C 2/28*     (2006.01)
    *C23C 2/40*     (2006.01)

(58) Field of Classification Search
    USPC ........................................................ 428/659
    See application file for complete search history.

(56) References Cited

U.S. PATENT DOCUMENTS

2019/0010595 A1\*   1/2019   Oh ............................ C23C 2/29
2019/0390303 A1\*  12/2019   Tokuda ..................... C23C 2/40

FOREIGN PATENT DOCUMENTS

| | | |
|---|---|---|
| JP | 2001-355053 A | 12/2001 |
| JP | 2004-225157 A | 8/2004 |
| JP | 2006-193791 A | 7/2006 |
| WO | 2011/001662 A1 | 1/2011 |

\* cited by examiner

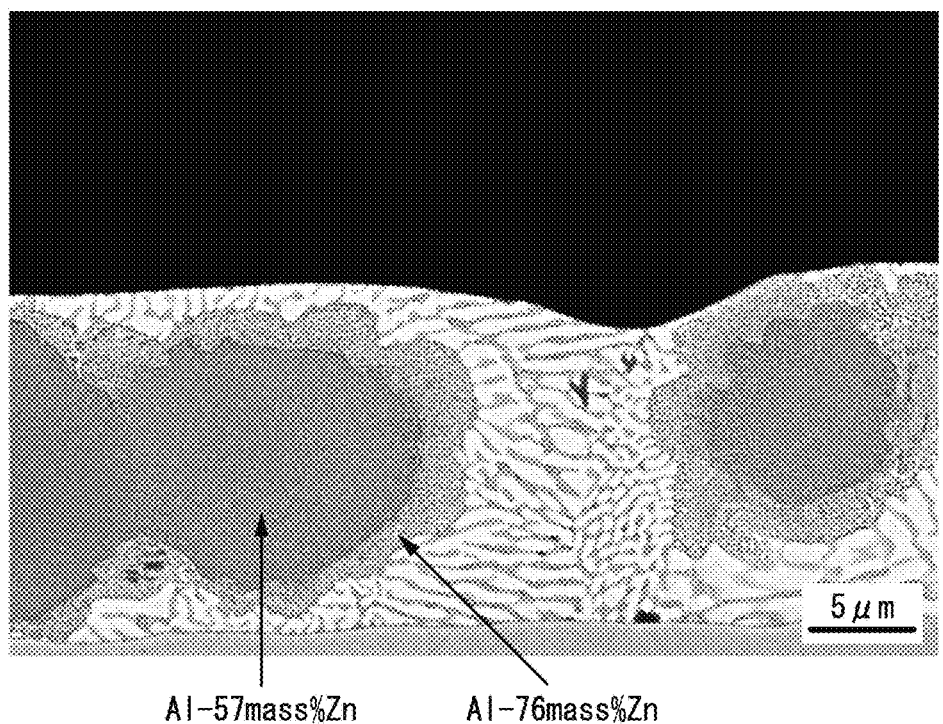

HOT-DIPPED ZN—AL—MG-BASED PLATED STEEL

TECHNICAL FIELD OF THE INVENTION

The present invention relates to hot-dip Zn—Al—Mg-based plated steel.

Priority is claimed on Japanese Patent Application No. 2020-100073, filed Jun. 9, 2020, the content of which is incorporated herein by reference.

RELATED ART

In the fields of building materials and civil engineering, hot-dip Zn—Al—Mg-based plated steels are often used in an uncoated state. Therefore, there is a demand for a hot-dip Zn—Al—Mg-based plated steel having excellent corrosion resistance on a flat portion. Recently, hot-dip Zn—Al—Mg-based plated steels are also used in the fields of home appliances and automobiles. In the fields of home appliances and automobiles, hot-dip Zn—Al—Mg-based plated steels are often used in a coated state. In addition, in the field of building materials, there are more and more occasions where hot-dip Zn—Al—Mg-based plated steels are used in a coated state. Therefore, there is a demand for a hot-dip Zn—Al—Mg-based plated steel that is less likely to cause swelling of a coating film due to corrosion. Patent Documents 1 to 6 describe various hot-dip Zn—Al—Mg-based plated steels.

Patent Document 1 describes a plated steel sheet having excellent corrosion resistance in which a Zn alloy plating layer that contains Mg: 1 to 10 wt %, Al: 2 to 19 wt %, and Si: 0.01 to 2 wt %, Mg and Al satisfying the following formula, Mg (%)+Al (%)≤20%, and contains a remainder consisting of Zn and unavoidable impurities is provided on a surface of the steel sheet, the Zn alloy plating layer has a metallographic structure in which a ($Mg_2Si$ phase), a ($MgZn_2$ phase), and a (Zn phase) are mixed in a matrix of an ($Al/Zn/MgZn_2$ ternary eutectic structure).

Patent Document 2 describes a hot-dip Zn—Al—Mg plated steel sheet having good corrosion resistance and good surface external appearance, which is a hot-dip Zn-based plated steel sheet in which a hot-dip Zn—Al—Mg plating layer containing Al: 4.0 to 10 wt %, Mg: 1.0 to 40 wt %, and a remainder consisting of Zn and unavoidable impurities is formed on a surface of the steel sheet, and the plating layer has a metallographic structure in which an (Al phase) is mixed in a matrix of an ($Al/Zn/MgZn_2$ ternary eutectic structure).

Patent Document 3 describes a coated steel sheet hawing excellent clarity and high corrosion resistance in which a zinc-based plating layer containing Al: 4 to 10 mass %, Mg: 1 to 5 mass %, Ti: 0.01 mass % or less, and a remainder consisting of zinc and unavoidable impurities is provided on one surface or both surfaces of the steel sheet, a chemical conversion coating of a chromate film or a phosphate coating is provided as an intermediate layer, and an organic coating layer having a thickness of 0.2 to 100 µm is provided as an upper layer.

Patent Document 4 describes a hot-dip Zn—Al—Mg—Si plated steel sheet having a uniform external appearance in which a Zn alloy plating layer containing Mg: 2.8% or more, Al: 10.5% or more, Si: 0.01 to 0.5%, and a remainder consisting of Zn and unavoidable impurities is provided, and an X-ray intensity ratio of $Mg_2Zn_{11}/MgZn_2$ in the Zn alloy plating layer is 0.5 or less.

Patent Document 5 describes a Zn—Al—Mg-based hot-dip plated steel sheet including a steel sheet, and a hot-dip plating layer containing 4 mass % or more and 22 mass % or less of Al, 1 mass % or more and 5 mass % or less of Mg, and a remainder consisting of Zn and unavoidable impurities, in which, in a cross section of the hot-dip plating layer parallel to a surface of the hot-dip plating layer, a diffraction intensity ratio I(200)/I(111), which is a ratio of an X-ray diffraction intensity I(200) of a (200) plane of an Al phase to an X-ray diffraction intensity I(111) of a (111) plane of an Al phase, is 0.8 or more.

Patent Document 6 describes a hot-dip Zn—Al—Mg—Si plated steel having excellent surface properties in which a plating layer containing Al: 5 to 18 mass %, Mg: 1 to 10 mass %, Si: 0.01 to 2 mass %, and a remainder consisting of Zn and unavoidable impurities is provided on a surface of the steel, and 200 or more (Al phases) are present per 1 $mm^2$ on the surface of the plated steel.

Recently, however, there is a demand for further improvement in corrosion resistance of flat portions of hot-dip Zn—Al—Mg-based plated steels, and there is also a strong demand for prevention of swelling of a coating film.

PRIOR ART DOCUMENT

Patent Document

[Patent Document 1] Japanese Unexamined Patent Application, First Publication No. 2000-104154

[Patent Document 2] Japanese Unexamined Patent Application, First Publication No. H10-226865

[Patent Document 3] Japanese Unexamined Patent Application, First Publication No. 2004-225157

[Patent Document 4] Japanese Unexamined Patent Application, First Publication No. 2006-193791

[Patent Document 5] PCT International Publication No. WO2011/001662

[Patent Document 6] Japanese Unexamined Patent Application, First Publication No. 2001-355053

DISCLOSURE OF THE INVENTION

Problems to be Solved by the Invention

The present invention has been made in view of the above circumstances, and an object thereof is to provide a hot-dip Zn—Al—Mg-based plated steel having excellent corrosion resistance in a flat part and capable of preventing swelling of a coating film even in a case where a coating film is formed on a plating surface.

Means for Solving the Problem

In order to solve the above problems, the present invention employs the following configurations.

[1] A hot-dip Zn—Al—Mg-based plated steel includes: a steel; and a plating layer formed on a surface of the steel, in which the plating layer contains, as an average composition, Mg: 1 to 10 mass %, Al: 4 to 22 mass %, and a remainder consisting of Zn and impurities, the plating layer includes an (Al—Zn mixed structure) in an area ratio of 10% to 70% in a cross section of the plating layer in a matrix of an ($Al/Zn/MgZn_2$ ternary eutectic structure), the (Al—Zn mixed structure) includes a first region that has a Zn concentration in a range of 75 mass % or more and less than 85 mass % and a second region that is present inside the first region and has a Zn concentration in a range of 67 mass % or more and less than 75 mass %, and an area ratio of the second region in the (Al—Zn mixed structure) in the cross section of the plating layer is more than 0% and 40% or less.

[2] The hot-dip Zn—Al—Mg-based plated steel according to [1], in which the plating layer contains, as the average composition, Mg: 1 to 10 mass %, Al: 8 to 22 mass %, and a remainder consisting of Zn and impurities, and the (Al—Zn mixed structure) includes the first region, the second region, and a third region that is present inside the second region and has a Zn concentration in a range of 55 mass % or more and less than 67 mass %.

[3] The hot-dip Zn—Al—Mg-based plated steel according to [1] or [2], in which the area ratio of the second region in the (Al—Zn mixed structure) is 5% to 40%.

[4] The hot-dip Zn—Al—Mg-based plated steel according to any one of [1] to [3], in which, in a case where the plating layer is halved into a steel side and a plating layer surface side at a ½ position in a plating thickness direction, nucleation points in a number proportion of 60% or more among nucleation points of the (Al—Zn mixed structure) are present in a region on the steel side of the plating layer.

[5] The hot-dip Zn—Al—Mg-based plated steel according to any one of [1] to [4], in which the plating layer further contains, as the average composition, 0.0001 to 2 mass % of Si.

[6] The hot-dip Zn—Al—Mg-based plated steel according to any one of [1] to [5], in which the plating layer further contains, as the average composition, any one or two or more of Ni, Ti, Zr, and Sr in a range of 0.0001 to 2 mass % in total.

[7] The hot-dip Zn—Al—Mg-based plated steel according to any one of [1] to [6], in which the plating layer further contains, as the average composition, any one or two or more of Sb, Pb, Sn, Ca, Co, Mn, B, Bi, Cr, Sc, Y, REM, and Hf in a range of 0.0001 to 2 mass % in total.

Effects of the Invention

According to the present invention, it is possible to provide a hot-dip Zn—Al—Mg-based plated steel having excellent corrosion resistance in a flat part and capable of preventing swelling of a coating film even in a case where a coating film is formed on a plating surface.

BRIEF DESCRIPTION OF THE DRAWINGS

FIG. 1 is a photograph of a cross section of a plating layer of Sample No. 1 taken with a scanning electron microscope, and is a photograph showing a reflected electron image of the plating layer.

EMBODIMENTS OF THE INVENTION

A hot-dip Zn—Al—Mg-based plated steel has a plating layer having components including Mg, Al, and a remainder consisting of Zn and impurities, and having a metallographic structure in which at least one of a ($MgZn_2$ phase), a (Zn phase), and an (Al—Zn mixed structure) is mixed in a matrix of an (Al/Zn/$MgZn_2$ ternary eutectic structure). In a case where the hot-dip plating layer contains Si in addition to Zn, Al, and Mg, a ($Mg_2Si$ phase) may be included in addition to the above phases and the structure. When forming the plating layer, the steel is immersed in a plating bath containing Mg, Al, and Zn, and then the steel is pulled up to solidify the molten metal adhered to the surface of the steel. When the plating layer solidifies, the (Al—Zn mixed structure) is crystallized, and thereafter the matrix of the (Al/Zn/$MgZn_2$ ternary eutectic structure) is crystallized, whereby the (Al—Zn mixed structure) is formed in the (Al/Zn/$MgZn_2$ ternary eutectic structure).

In order to improve corrosion resistance of a flat part of such a hot-dip Zn—Al—Mg-based plated steel, the present inventors conducted intensive studies and found that the (Al—Zn mixed structure) is an initial starting point of corrosion. The (Al—Zn mixed structure) is derived from an Al" phase (an Al solid solution having Zn dissolved therein, and often containing a small amount of Mg) at a high temperature in an Al—Zn—Mg ternary equilibrium phase diagram, and is in a state including a fine Zn phase and a fine Al phase at room temperature according to the phase diagram. A detailed examination of a structure of the (Al—Zn mixed structure) was conducted, and it was found that the (Al—Zn mixed structure) can be divided into a first region having a relatively high Zn concentration and a second region having a relatively low Zn concentration, and the corrosion resistance of the flat part tends to decrease as a proportion of the second region increases. It was also determined that an existing hot-dip Zn—Al—Mg-based plated steel has a relatively high proportion of the second region. Therefore, it was found that a hot-dip Zn—Al—Mg-based plated steel having excellent corrosion resistance in a flat part is obtained by selecting manufacturing conditions that reduce the proportion of the second region. In addition, it was determined that by improving the corrosion resistance of the flat part of the hot-dip Zn—Al—Mg-based plated steel, even in a case where a coating film is formed on a surface of a plating layer of the hot-dip Zn—Al—Mg-based plated steel, swelling of the coating film can be prevented.

A hot-dip Zn—Al—Mg-based plated steel of the present embodiment includes: a steel; and a plating layer formed on a surface of the steel, in which the plating layer contains, as an average composition, Mg: 1 to 10 mass %, Al: 4 to 22 mass %, and a remainder consisting of Zn and impurities, the plating layer includes an (Al—Zn mixed structure) in an area ratio of 10% to 70% in a cross section of the plating layer in a matrix of an (Al/Zn/$MgZn_2$ ternary eutectic structure), the (Al—Zn mixed structure) includes a first region that has a Zn concentration in a range of 75 mass % or more and less than 85 mass % and a second region that is present inside the first region and has a Zn concentration in a range of 67 mass % or more and less than 75 mass %, and an area ratio of the second region in the (Al—Zn mixed structure) in the cross section of the plating layer is more than 0% and 40% or less.

In the hot-dip Zn—Al—Mg-based plated steel of the present embodiment, in a case where the plating layer contains, as the average composition, Mg: 1 to 10 mass %, Al: 8 to 22 mass %, and a remainder consisting of Zn and impurities, the (Al—Zn mixed structure) may include the first region, the second region, and a third region that is present inside the second region and has a Zn concentration in a range of 55 mass % or more and less than 67 mass %.

In addition, the area ratio of the second region in the (Al—Zn mixed structure) may be 5% to 40%.

Furthermore, in a case where the plating layer is halved into a steel side and a plating layer surface side at a ½ position in a plating thickness direction, it is preferable that nucleation points in a number proportion of 60% more among nucleation points of the (Al—Zn mixed structure) are present in a region on the steel side of the plating layer.

Hereinafter, the hot-dip Zn—Al—Mg-based plated steel of the present embodiment will be described.

There are no particular restrictions on a material of the steel that serves as a base material of the plating layer. As the material, general steel, Al killed steel, and some high alloy steel can be applied, and a shape of the steel is not particularly limited. The steel may also be subjected to Ni pre-plating. The plating layer according to the present embodiment is formed by applying a hot-dip plating method, which will be described later, to the steel.

Next, a chemical composition of the plating layer will be explained.

The plating layer according to the present embodiment contains, as the average composition Mg: 1 to 10 mass %, Al: 4 to 22 mass %, and the remainder consisting of Zn and impurities. In addition, the plating layer may contain, as the average composition, Si: 0.0001 to 2 mass %. Furthermore, the plating layer may contain, as the average composition, 0.0001 to 2 mass % of any one or two or more of Ni, Ti, Zr, and Sr in total. Furthermore, the plating layer may contain, as the average composition, 0.0001 to 2 mass % of any one or two or more of Sb, Pb, Sn, Ca, Co, Mn, P, B, Bi, Cr, Sc, Y, REM, and Hf in total.

A Mg content is in a range of 1 to 10 mass % as the average composition. Mg is an element necessary for improving corrosion resistance of the plating layer. When the Mg content in the plating layer is less than 1 mass %, an effect of improving the corrosion resistance becomes insufficient. When the Mg content exceeds 10 mass %, generation of dross in a plating bath becomes significant, and there are points where plating is not normally formed due to adhesion of the dross to the plating. Therefore, there is a concern that the corrosion resistance decreases. Therefore, the Mg content is set to 10 mass % or less. From a viewpoint of a decrease in the corrosion resistance due to the generation of the dross, the Mg content is preferably set to 1.5 to 6 mass %. The Mg content is more preferably set to be in a range of 2 to 5 mass %.

An Al content is in a range of 4 to 22 mass % as the average composition. Al is an element necessary for securing the corrosion resistance. When the Al content in the plating layer is less than 4 mass % the effect of improving the corrosion resistance becomes insufficient. When the Al content exceeds 22 mass %, the corrosion resistance decreases for unknown reasons. From the viewpoint of the corrosion resistance, the Al content is preferably set to 8 to 22 mass %. The Al content is more preferably set to 9 to 13 mass %.

In addition, the plating layer may contain Si in a range of 0.0001 to 2 mass %. Si is an effective element for improving adhesion of the plating layer. By including 0.0001 mass % or more of Si, an effect of improving the adhesion is exhibited, so that it is preferable to include 0.0001 mass % or more of Si. On the other hand, even if a Si content exceeds 2 mass %, an effect of improving plating adhesion is saturated, so the Si content is set to 2 mass % or less. From a viewpoint of the plating adhesion, the Si content may be in a range of 0.02 to 1 mass %, or in a range of 0.03 to 0.8 mass %.

In addition, the plating layer may contain, as the average composition, 0.0001 to 2 mass % of any one or two or more of Ni, Ti, Zr, and Sr in total. An intermetallic compound containing these elements acts as a crystallization nucleus for the (Al—Zn mixed structure), making the (Al/MgZn$_2$/Zn ternary eutectic structure) finer and more uniform, thereby improving an external appearance and smoothness of the plating layer. The reason why the total amount of one or two or more of these elements is set to 0.0001 to 2 mass % is that when the total amount is less than 0.0001 mass %, an effect of making a solidification structure fine and uniform is insufficient and when the total amount exceeds 2 mass %, not only is the effect of refining the (Al/Zn/MgZn$_2$ ternary eutectic structure) saturated, but on the contrary, a surface roughness of the plating layer increases and the external appearance deteriorates. Therefore, an upper limit of the total amount is set to 2 mass %. In a case where the elements are added particularly for the purpose of improving the external appearance, it is desirable to include the elements in an amount of 0.001 to 0.5 mass %. The amount is more preferably in a range of 0.001 to 0.05 mass %, and even more preferably in a range of 0.002 to 0.01 mass %.

The plating layer may contain, as the average composition, 0.0001 to 2 mass % of one or more of Sb, Pb, Sn, Ca, Co, Mn, P, B, Bi, Cr, Sc, Y, REM, and Hf in total. The corrosion resistance can be further improved by including these elements. REM is one or more of rare earth elements with atomic numbers 57 to 71 in the periodic table.

The remainder of the chemical composition the plating layer consists of zinc and impurities.

Next, a structure of the plating layer will be described. The plating layer according to the present embodiment includes, in the matrix of the (Al/Zn/MgZn$_2$ ternary eutectic structure), the (Al—Zn mixed structure) in an area ratio of 10% to 70% with respect to a total area of all structures constituting the plating layer. In addition, the matrix of the (Al/Zn/MgZn$_2$ ternary eutectic structure) may include, in addition to the (Al—Zn mixed structure), a (MgZn$_2$ phase), a (Zn phase), and a (Mg$_2$Si phase).

The (Al/Zn/MgZn$_2$ ternary eutectic structure) is a ternary eutectic structure of an Al phase, a Zn phase, and a MgZn$_2$ phase which is an intermetallic compound, and the Al phase forming the (Al/Zn/MgZn$_2$ ternary eutectic structure) corresponds to an "Al phase" (an Al solid solution having a Zn phase dissolved therein, and often containing a small amount of Mg) at a high temperature in an Al—Zn—Mg ternary equilibrium phase diagram, for example. This Al" phase at a high temperature usually appears separated into a fine Al-based phase and a fine Zn-based phase at room temperature. The Zn phase in the (Al/Zn/MgZn$_2$ ternary eutectic structure) is a Zn solid solution in which a small amount of Al is dissolved and, in some cases, a smaller amount of Mg is also dissolved. The MgZn$_2$ phase in the (Al/Zn/MgZn$_2$ ternary eutectic structure) is an intermetallic compound phase that is present in the vicinity of Zn: about 84 mass % in a Zn—Mg binary equilibrium phase diagram. As seen from the phase diagram, even if Si and other elements are dissolved in each phase, the amounts thereof are considered to be small, and cannot be clearly distinguished in a normal analysis. Therefore, a ternary eutectic structure including these three phases is represented as the (Al/Zn/MgZn$_2$ ternary eutectic structure) in the present specification.

Next, the (Al—Zn mixed structure) will be described. In the present embodiment, a structure in which the Al" phase as a high-temperature phase is formed separately into a fine Zn-based phase and a fine Al-based phase during cooling is referred to as the (Al—Zn mixed structure). In addition, the Zn-based phase may contain Al and Mg dissolved therein. The Al-based phase may contain Zn and Mg dissolved therein.

The (Al—Zn mixed structure) is a phase that appears as islands with clear boundaries in the matrix of the (Al/Zn/MgZn$_2$ ternary eutectic structure) in a reflected electron image of a scanning electron microscope, and corresponds to an Al" phase (an Al solid solution having a Zn phase dissolved therein, and containing a small amount of Mg) at a high temperature in an Al—Zn—Mg ternary equilibrium phase diagram, for example. In the Al" phase at a high temperature, the amounts of Zn and Mg dissolved differ depending on Al and Mg concentrations in the plating bath. The Al" phase at a high temperature is usually separated into a fine Al-based phase and a fine Zn-based phase at room temperature, but it can be considered that island shapes seen at room temperature retain remains of the Al" phase at a high temperature. As seen from the phase diagram, it is considered that Si and other additive elements are not dissolved in this phase or are dissolved only in an extremely small amount, and cannot be clearly distinguished in a normal analysis. Therefore, a structure that is derived from the Al" phase at a high temperature and retains the remains of the Al" phase in terms of shape is referred to as the (Al—Zn mixed structure) in the present specification. This (Al—Zn mixed structure) can be clearly distinguished from the Al phase forming the (Al/Zn/MgZn$_2$ ternary eutectic structure) in the reflected electron image of the scanning electron microscope.

The area ratio of the (Al—Zn mixed structure) in the cross section of the plating layer is preferably in a range of 10% to 70%. When the area ratio of the (Al—Zn mixed structure) is within this range, corrosion resistance of a flat portion can be improved.

As a method of measuring the area ratio, the cross section of the plating layer is observed in the reflected electron image of the scanning electron microscope. Photographs of five points are taken at a magnification of 1,000-fold. The photographs are taken so that an overall thickness of the plating layer is within a visual field. Photographing positions are randomly selected. The photographing positions should not be reselected according to a calculation result of the area ratio. Furthermore, elemental mapping data corresponding to the taken photographs is acquired using an energy dispersive X-ray elemental analyzer attached to the scanning electron microscope, and the (Al—Zn mixed structure) is specified. Then, a total Toss-sectional area of the (Al—Zn mixed structure) appearing in all the photographs of the cross section is measured, and this is divided by a cross-sectional area of the plating layer appearing in all the photographs of the cross sections, whereby the area ratio of the (Al—Zn mixed structure) is measured.

The (Zn phase) is a phase that appears as islands with clear boundaries in the matrix of (Al/Zn/MgZn$_2$ ternary eutectic structure), and may contain a small amount of Al or a small amount of Mg dissolved therein in practice. As e from the phase diagram, it is considered that Si and other additive elements are not dissolved in this phase, or are dissolved only in au extremely small amount. This (Zn phase) can be clearly distinguished from the Zn phase forming the (Al/Zn/MgZn$_2$ ternary eutectic structure) in the reflected electron image of the scanning electron microscope. There are cases where the plating layer of the present embodiment contains the (in phase) depending on manufacturing conditions. However, since there is almost no effect on the improvement in the corrosion resistance of the flat portion in an experiment, there is particular problem even if the plating layer contains the (Zn phase).

The (MgZn$_2$ phase) is a phase that appears islands with clear boundaries in the matrix of the (Al/Zn/MgZn$_2$ ternary eutectic structure), and may contain a small amount of Al dispersed and dissolved therein in practice. As seen from the phase diagram, it is considered that Si and other additive elements are not dissolved in this phase, or are dissolved only in an extremely small amount. This (MgZn$_2$ phase) can be clearly distinguished from the MgZn$_2$ phase forming the (Al/Zn/MgZn$_2$ ternary eutectic structure) in the reflected electron image of the scanning electron microscope. There are cases where the plating layer of the present embodiment does not contain the (MgZn$_2$ phase) depending on the manufacturing conditions. However, the (MgZn$_2$ phase) is contained in the plating layer under most manufacturing conditions.

The (Mg$_2$Si phase) is a phase that appears as islands with clear boundaries in the solidification structure of the plating layer containing Si. As seen from the phase diagram, it is considered that Zn, Al, and other additive elements are not dissolved, or are dissolved only in an extremely small amount. This (Mg$_2$Si phase) can be clearly distinguished in the plating in the reflected electron image of the scanning electron microscope.

Next, a microstructure of the (Al—Zn mixed structure) will be described. The (Al—Zn mixed structure) exhibits island shapes that retain the remains of the Al" phase at a high temperature, as described above. In addition, according to the phase diagram, an internal structure of the (Al—Zn mixed structure) is presumed to exhibit a form separated into a fine Al phase and a fine Zn phase at room temperature.

On the other hand, when a distribution of the Zn concentration of the (Al—Zn mixed structure) is seen, the (Al—Zn mixed structure) can be divided into at least the first region and the second region that is present inside the first region and has a lower average Zn concentration than that of the first region. In a case where an average Al concentration of the plating layer is 8 to 22 mass %, the third region that is present inside the second region and has a lower average Zn concentration than that of the second region is included. The first region is located on an outermost side of the (Al—Zn mixed structure) in a case where the plating layer is viewed in a cross section, and forms a boundary with the (Al/Zn/MgZn$_2$ ternary eutectic structure). The second region is present inside the first region, and the third region is present further inside the second region.

The first region is a region having a Zn concentration of 75 mass % or more and less than 85 mass %, the second region is a region having a Zn concentration of 67 mass % or more and less than 75 mass %, and the third region is a region having a Zn concentration of 55 mass % or more and less than 67 mass %. The remainder other than Zn consists of Al and impurities. In a case where the plating layer contains Si, there are cases where Si is contained in any one or all of the first region, the second region, and the third region.

A proportion of the second region in the (Al—Zn mixed structure) is the area ratio in a case where the plating layer is viewed in a cross section, and needs to be in a range of more than 0% and 40% or less with respect to the (Al—Zn mixed structure). The proportion of the second region may be in a range of 5% to 40%, in a range of 5% to less than 40%, or in a range of 5% to 35%. The smaller the proportion of the second region in the (Al—Zn mixed structure), the better the corrosion resistance of the flat part. However, setting the area ratio of the second region to 0% is difficult in terms of manufacturing, so that a lower limit thereof is set to more than 0%. In addition, when the second region exceeds 40%, the corrosion resistance of the flat part decreases, so that an upper limit thereof is set to 40% or less. It has been confirmed that when corrosion starts, particularly the second region having a Zn concentration of 67 mass % or more and less than 75 mass % is preferentially corroded in the (Al—Zn mixed structure) of the plating layer. Therefore, it is presumed that the corrosion resistance of the flat part is improved by reducing the second region, which is a starting point of corrosion.

There is no particular need to limit area ratios of the first region and the third region.

A method of specifying the microstructure of the (Al—Zn mixed structure) will be described. The method of specifying the microstructure of the (Al—Zn mixed structure) utilizes the elemental mapping data of the photograph used to measure the area ratio of the (Al—Zn mixed structure). First, the distribution of the Zn concentration inside the (Al—Zn mixed structure) is analyzed. For the analysis, the energy dispersive X-ray elemental analyzer attached to the scanning electron microscope (SEM) is used, and an accelerating voltage of the SEM is set to 15 kV. In this case, the Zn concentration is substantially measured for each region of about 1 $\mu m^2$ from a relationship of escape depths of characteristic X-rays. By mapping this, component analysis with a mesh of about 1 μm becomes possible. Based on the Zn concentration (mass %) obtained from a result of the component analysis, the ranges of the first, second, and third regions are determined.

Specifically, from the result of the component analysis, a region having a Zn concentration in a range of 75 mass % or more and less than 85 mass % is specified as the first region, a region having a Zn concentration in a range of 67 mass % or more and less than 75 mass % is specified as the second region, and a region having a Zn concentration in a range of 55 mass % or more and less than 67 mass % is specified as the third region. Then, a cross-sectional area of each region is measured. The above measurement is performed on all the (Al—Zn mixed structures) appearing in all the photographs, and a total area of the second regions in all the (Al—Zn mixed structures) is measured. Then, the area ratio of the second region is measured by dividing the total area of the second region by the (total cross-sectional area of the Al—Zn mixed structures) to be measured.

As will be described later, the hot-dip Zn—Al—Mg-based plated steel of the present embodiment is formed by solidifying molten metal adhered to the surface of the steel by immersing the steel in the plating bath and then pulling up the steel. As described above, when the plating layer solidifies, the (Al—Zn mixed structure) is first crystallized, and thereafter the matrix of the (Al/Zn/MgZn$_2$ ternary eutectic structure) is crystallized. The (Al—Zn mixed structure) that is initially crystallized is derived from the high-temperature Al" phase in the Al—Zn—Mg ternary equilibrium phase diagram, and this high-temperature Al" phase ultimately becomes the (Al—Zn mixed structure) in the present embodiment. In the (Al—Zn mixed structure), first, nucleation points generated in the molten metal become starting points, primary arms grow from the nucleation points, and secondary arms are further generated from the primary arms. Therefore, the (Al—Zn mixed structure) is a dendrite-like structure starting from the nucleation points.

In the hot-dip Zn—Al—Mg-based plated steel of the present embodiment, it is preferable that in a case where the plating layer is halved into the steel side and the plating layer surface side at the ½ position in the plating thickness direction, nucleation points in a number proportion of 60% or more among the nucleation points of the (Al—Zn mixed structure) are present in a region on the steel side of the plating layer. Accordingly, among structures constituting the plating layer, the (Al—Zn mixed structure), which becomes the initial starting point of corrosion, is present in a large proportion in the region on the steel side, and a proportion of the (Al—Zn mixed structure) in a region on the surface side of the plating layer becomes small. Accordingly, the corrosion resistance of the flat part of the plating layer is further enhanced.

In a case where a coating film is formed on the plating layer, the (Al—Zn mixed structure) can be a factor that hinders the adhesion between the plating layer and the coating film. Due to the presence of a large proportion of the (Al—Zn mixed structure) in the region on the steel sheet side of the plating layer, a proportion of the (Al—Zn mixed structure) exposed to the surface relatively decreases, so that an effect of preventing swelling of the coating film in the case where the coating film is formed on the plating surface is further enhanced.

A method of measuring a distribution of the nucleation points in the (Al—Zn mixed structure) is as follows. First, the thickness of the plating layer is measured by observing the cross section of the plating layer. Subsequently, on the surface of the plating layer, a square region with a side of 1 mm is used as a measurement region. Next, the plating layer in the measurement region is gradually ground from the surface, and a newly appeared ground surface is observed with an electron microscope. Specifically, when the overall thickness of the plating layer is indicated as t, a t/4 position, a t/2 position, and a 3t/4 position are sequentially exposed in a depth direction from the plating layer surface by the grinding and on each ground surface, a morphology of the (Al—Zn mixed structure) is checked with the electron microscope each time. A grinding depth is controlled by observing a shape change in an indentation given in advance.

The nucleation point in the (Al—Zn mixed structure) is a connecting point between the primary arms of the (Al—Zn mixed structure). On a ground surface relatively far from the (nucleation point of the Al—Zn mixed structure), the primary arms seem to be arranged discretely, while on a ground surface relatively close to the nucleation point, four or six primary arms seem to be close to each other. Therefore, when observing each ground surface, whether the nucleation point is n the steel side of the ground surface being observed or on the surface side of the plating layer is presumed from the change in the shape of the primary arms on each ground surface. In this manner, by checking the morphology of the (Al—Zn mixed structure) each time on the ground surfaces at the t/4 position, the t/2 position, and the 3t/4 position in the depth direction from the plating layer surface, it can be checked whether the nucleation point is on the steel side or on the plating layer surface side from the t/2 position. Then, the proportion of the number of nucleation points on the steel side from the t/2 position to the total number of nucleation points of (Al—Zn mixed structure) observed in the measurement region is obtained. The above method is performed on a total of five measurement regions, and an average of obtained values is taken as the proportion of the number of nucleation points on the steel side from the t/2 position of the plating layer.

An adhesion amount of the plating layer is preferably in a range of 10 to 300 $g/m^2$, and may be in a range of 20 to 250 $g/m^2$. When the adhesion amount of the plating layer is small, sufficient corrosion resistance cannot be secured. When the adhesion amount of the plating layer is too large, there is a concern that cracks may occur in the plating layer when the steel is processed into a component shape or the like.

Next, a method of manufacturing the hot-dip Zn—Al—Mg-based plated steel according to the present embodiment will be described. The hot-dip Zn—Al—Mg-based plated steel of the present embodiment is formed by a so-called hot-dip plating method in which a plating bath is applied to a surface of a steel, and then the steel is pulled up from the plating bath to solidify molten metal adhered to the surface of the steel.

A composition of the plating bath may contain Mg: 1 to 10 mass %. Al: 4 to 22 mass %, and a remainder consisting of Zn and impurities. In addition, the plating bath may contain Si: 0.0001 to 2 mass %. Furthermore, the plating bath may contain 0.0001 to 2 mass % of any one or two or more of Ni, Ti, Zr, and Sr in total. Furthermore, the plating bath contains 0.0001 to 2 mass % of any one or two or more of Sb, Pb, Sn, Ca, Co, Mn, P, B, Bi, Cr, Sc, Y, REM, and Hf in total.

A temperature of the plating bath is preferably in a range of higher than 380° C. and 600° C. or lower, and may be in a range of 400° C. to 600° C.

The surface of the steel before being immersed in the plating bath is preferably subjected to a reduction treatment by heating in a reducing atmosphere. For example, a heat treatment is performed in a mixed atmosphere of nitrogen and hydrogen at 600° C. or higher, preferably 750° C. or higher, for 30 seconds or longer. The steel that has undergone the reduction treatment is cooled to the temperature of the plating bath and is thereafter immersed into the plating bath. An immersion time may be, for example, 1 second or longer. When pulling up the steel immersed in the plating bath, a plating adhesion amount is adjusted by gas wiping. As described above, the adhesion amount is preferably in a range of 10 to 300 g/m², and may be in a range of 20 to 250 g/m².

In the method of manufacturing the hot-dip Zn—Al—Mg-based plated steel of the present embodiment, a cooling condition after pulling-up from the plating bath is important. There are the following two cooling conditions, and either condition may be adopted.

A cooling condition until the steel reaches a temperature of 365° C. to 380° C. after being pulled up from the plating bath is not particularly limited, and may be about 5 to 10° C./sec, which is a normal cooling condition.

The first cooling condition is a condition in which the steel is pulled up from the plating bath, is thereafter held at a constant temperature in a temperature range of 365° C. to 380° C. where the plating layer before reaching atop roll is not completely solidified, and is thereafter rapidly cooled from 365° C. The temperature here is a surface temperature of the molten metal (plating layer). A retention time in a case where the steel is held at a constant temperature in a temperature range of 365° C. to 380° C. is preferably in a range of 10 to 300 seconds. In addition, an average cooling rate in a case of rapid cooling after constant holding at 365° C. to 380° C. is preferably in a range of 50 to 100° C./sec. For the rapid cooling, rapid cooling may be performed immediately after an end of the temperature retention time. In addition, the rapid cooling may be performed until the temperature of the plating layer reaches 100° C. or lower. By performing such holding and rapid cooling, a target structure is obtained. The reason for holding the steel in the temperature range of 365° C. to 380° C. is to promote growth of the high-temperature Al" phase formed at that temperature by a solid-liquid interface reaction from a liquid phase remaining an unsolidified state in the plating. In a completely solidified state, element transfer between structures is not promoted, and the high-temperature Al" phase does not growth, so that the target structure cannot be obtained. The reason for rapid cooling from 365° C. is to suppress formation of the high-temperature Al" phase, which becomes the second region of the (Al—Zn mixed structure). In a case where the plating layer is completely solidified and thereafter reheated and held in the temperature range of 365° C. to 380° C., there is a possibility that a Mg2Zn11 phase that deteriorates the corrosion resistance is formed, which is not preferable. When the Mg content in the plating layer is less than 1 mass %, a proportion of the liquid phase remaining in the unsolidified state in the plating is small in the temperature: range of 365° C. to 380° C., so that the growth of the high-temperature Al" phase cannot be promoted, and the target structure cannot be obtained. From a viewpoint of promoting the growth of the high-temperature Al" phase, the Mg content in the plating layer is preferably 1.5 mass % or more.

The second cooling condition is a condition in which the steel is pulled up from the plating bath, is thereafter slowly cooled between 380° C. and 365° C. at which the plating layer before reaching the top roll is not completely solidified, and is thereafter rapidly cooled. The temperature here is the surface temperature of the molten metal (plating layer). An average cooling rate in the case of the slow cooling in the temperature range from 380° C. to 365° C. is preferably in a range of 0.1 to 0.4° C./sec. In addition, an average cooling rate in the case of the rapid cooling after the slow cooling is preferably in a range of 50 to 100° C./sec. For the rapid cooling, rapid cooling may be performed immediately after an end of the slow cooling. In addition, the rapid cooling may be performed until the temperature of the plating layer reaches 100° C. or lower.

When the above cooling conditions are not satisfied, the area ratio of the second region cannot be within the range of more than 0% and 40% or less.

As described above, the hot-dip Zn—Al—Mg-based plated steel of the present embodiment can be manufactured.

The hot-dip Zn—Al—Mg-based plated steel of the present embodiment is excellent in the corrosion resistance of the flat part, and can prevent swelling of the coating film even in a case where the coating film is formed on the plating surface.

EXAMPLES

SPCC (JIS G3141) having a sheet thickness of 0.8 mm was degreased, was thereafter heated and reduced in a $N_2$—$H_2$ atmosphere at 800° C. for 60 seconds using a hot-dip plating simulator manufactured by TOEISHA, was cooled to a plating bath temperature, and was immersed in a plating bath at 450° C. having the same composition as an average composition of a plating layer shown in Table 1 for 3 seconds. Thereafter, a plating adhesion amount was set to 135 g/m² on one side by $N_2$ wiping.

For control of an (Al—Zn mixed structure), cooling control was performed after plating. Holding or staying was performed for 10 to 300 seconds between 380° C. and 365° C. at which the plating layer before reaching a top roll was not completely solidified, and thereafter rapid cooling to 100° C. or lower was performed at an average cooling rate of 50 to 100° C./sec, whereby a target configuration and structure was obtained. In Invention Examples 47 to 52, slow cooling (an average cooling rate n a range of 0.1 to 0.4° C./sec during slow cooling) was performed between 380° C. to 365° C. for 40 to 150 seconds, and rapid cooling) to 100° C. or lower was thereafter performed. In the other invention examples, holding at 375° C. was performed only for a retention time shown in Table 1, and rapid cooling to 100° C. or lower was thereafter performed. In Comparative Example 5, holding or slow cooling was not performed between 380° C. to 365° C. As an example of a cross-sectional SEM image of a manufactured sample, a photograph of a cross section of a plating layer of No. 1 is shown in FIG. 1. Results are shown in Tables 1A, 1B, 2A, and 2B.

Tables 1A and 1B show cooling conditions after plating and average compositions of plating layers. Tables 2A and 2B show area ratios of (Al—Zn mixed structures) in cross sections of the plating layers, area ratios of second regions in the (Al—Zn mixed structures), average Zn concentrations of first regions, the second regions, and third regions, and positions of nucleation points of the (Al—Zn mixed structures). In addition, evaluation results of flat surface corrosion resistance and corrosion resistance after coating are shown.

The average composition of the plating layer was measured by analyzing the amounts of elements contained in the plating layer by inductively coupled plasma optical emission spectroscopy after peeling and dissolving the plating layer.

The area ratio of the (Al—Zn mixed structure) in the plating layer was obtained by photographing five reflected electron images of the cross section of the plating layer at a magnification of 1,000-fold with a scanning electron microscope. The photographs were taken so that an overall thickness of the plating layer was within a visual field. Photographing positions were randomly selected. Furthermore, elemental mapping data corresponding to the taken photographs was acquired using an energy dispersive X-ray elemental analyzer attached to the scanning electron microscope, and the (Al—Zn mixed structure) was specified. Then, a total cross-sectional area of the (Al—Zn mixed structure) appearing in all the photographs of the cross sections vas measured, and this was divided by a cross-sectional area of the plating layer appearing in all the photographs of the cross sections, whereby the area ratio of the (Al—Zn mixed structure) was measured.

The area ratio of the second region and the average Zn concentrations of the first, second, and third regions in the (Al—Zn mixed structure) were measured as follows, Five reflected electron images of the cross section of the plating layer were photographed at a magnification of 1,000-fold with the scanning electron microscope. The photographs were taken so that the overall thickness of the plating layer was within a visual field. Photographing positions were randomly selected. Furthermore, elemental mapping data corresponding to the taken photographs was acquired using the energy dispersive X-ray elemental analyzer attached to the scanning electron microscope, and the (Al—Zn mixed structure) was specified. An accelerating voltage of the SEM was set to 15 kV when acquiring the elemental mapping data. In this case, the Zn concentration is measured for each region of about 1 μm$^2$, and component analysis is possible with a mesh of about 1 μm. Based on the Zn concentration (mass %) obtained from a result of the component analysis of the elemental mapping data, ranges of the first, second, and third regions were determined.

Specifically, a region having a Zn concentration in a range of 75 mass % or more and less than 85 mass % was specified as the first region, a region having a Zn concentration in a range of 67 mass % or more and less than 75 mass % was specified as the second region, and a region having a Zn concentration in a range of 55 mass % or more and less than 67 mass % was specified as the third region. Then, a cross-sectional area of each region was measured. The above measurement is performed on all the (Al—Zn mixed structures) appearing in all the photographs, and a total area of the second regions in all the (Al—Zn mixed structures) is measured. Then, the area ratio of the second region was measured by dividing the total area of the second region by the total cross-sectional area of the (Al—Zn mixed structures) to be measured.

The average Zn concentration in each region was obtained from measurement results of the Zn concentrations in the first, second, and third regions.

A method of measuring a distribution of the nucleation points in the (Al—Zn mixed structure) was as follows. First, the thickness of the plating layer was measured by observing the cross section of the plating layer. Subsequently, on a surface of the plating layer, a square region with a side of 1 mm was used as a measurement region. Next, the plating layer in the measurement region was gradually ground from the surface, and the newly appeared ground surface was observed with an electron microscope. Specifically, when the overall thickness of the plating layer was indicated as t, ground surfaces at the t/4 position, the t/2 position, and the 3t/4 position were sequentially exposed in a depth direction from the plating layer surface, and on each ground surface, a morphology of the (Al—Zn mixed structure) was checked with the electron microscope each time. A grinding depth was controlled by observing a shape change in an indentation given in advance.

The nucleation point in the (Al—Zn mixed structure) is a connecting point between the primary arms of the (Al—Zn mixed structure). On a ground surface relatively far from the nucleation point of the (Al—Zn mixed structure), the primary arms seem to be arranged discretely, while on a ground surface relatively close to the nucleation point, four or six primary arms seem to be close to each other. Therefore, when observing each ground surface, whether the nucleation point was on a steel side of the ground surface being observed or on a surface side of the plating layer was presumed from a change in shape of the primary arms on each ground surface. In this manner, by checking a morphology of the (Al—Zn mixed structure) each time on the ground surfaces at the t position, the t/2 position, and the 3t/4 position in the depth direction from the plating layer surface, it was checked whether the nucleation point was on the steel side or on the plating layer surface side from the t/2 position. Then, a proportion of the number of nucleation points on the steel side from the t/2 position to the total number of nucleation points of (Al—Zn mixed structure) observed in the measurement region was obtained. The above method was performed on a total of five measurement regions, and an average of obtained values was taken as the proportion of the number of nucleation points on the steel side from the t/2 position of the plating layer.

Tables 2A and 2B have columns for the positions of the nucleation points of the (Al—Zn mixed structure). In a case where the plating layer was halved into a steel side and a plating layer surface side at the ½ position in a plating thickness direction, a case where nucleation points in a number proportion of 60% or more among the nucleation points of the (Al—Zn mixed structure) were present in a region on the steel side of the plating layer was marked with O, while a case except the above case was marked with X.

The obtained alloy plated steel sheet was cut into a size of 100 mm×50 mm and subjected to a flat surface corrosion resistance evaluation test. Evaluation of flat surface corrosion resistance was performed by conducting a corrosion acceleration test specified by JASO-CCT-M609, and comparing corrosion weight losses after 120 cycles. Evaluation criteria are as follows, and A, B, and C were evaluated as acceptable.

A: Corrosion weight loss less than 40 g/m²

B: Corrosion weight loss 40 g/m² or more and less than 60 g/m²

C: Corrosion weight loss 60 g/m² or more and less than 80 g/m²

D: Corrosion weight loss 80 g/m² or more

Corrosion resistance after coating (swelling of a coating film after coating) was evaluated by forming a chemical conversion layer having a film thickness of 1.2 μm on a flat sheet test piece, forming a coating film layer having a film thickness of 20 μm, thereafter applying a cut defect reaching a base metal onto a front surface with a cutter knife, and applying 120 cycles of CCT having 4 hours of SST, 2 hours of drying, and 2 hours of wetting as one cycle. A maximum swelling width on one side of cut damage after the test was determined.

Chemical Conversion Layer

A chromate-free chemical conversion treatment solution containing a mixture of a silane coupling agent, tannic acid, silica, and a polyester resin was applied to the plating layer and dried to form a chemical conversion treatment film.

Coating Film Layer

A coating film layer was formed by applying a primer lacquer resin and a top coating lacquer resin described below onto the chemical conversion treatment film. A thickness of a layer made of the primer lacquer resin was set to 5 μm, and a thickness of a layer made of the top coating lacquer resin was set to 15 μm, for a total thickness of 20 μm.

Film-Forming Components of Coating Film Layer (1) Primer Lacquer Resin of Front and Rear Surfaces Polyester/melamine+isocyanate combined hardening type (FLC687 lacquer resin manufactured by Japan Fine Coatings Co., Ltd.)

(2) Top Coating Lacquer Resin of Front Surface

Polymer polyester/melamine hardening type (FLC7000 lacquer resin manufactured by Japan Fine Coatings Co., Ltd.)

(3) Top Coating Lacquer Resin of Rear Surface

Polyester/melamine hardening type (FLC100HQ lacquer resin manufactured by Japan Fine Coatings Co., Ltd.)

Evaluation criteria for corrosion resistance after coating are shown below. Determination was made by ratings shown below. A, B, and C were evaluated as acceptable.

A: Maximum swelling width less than 5 mm

B: Maximum swelling width 5 mm or more and less than 8 mm

C: Maximum swelling width 8 mm or more and less than 10 mm

D: Maximum swelling width 10 mm or more

TABLE 1A

| | | Cooling conditions after plating | | Average composition (mass %) of plating layer remainder consisting of Zn and impurities | | | | |
|---|---|---|---|---|---|---|---|---|
| Classification | No. | Holding or staying at constant temperature in temperature range of 365° C. to 380° C. | Retention time or staying time (sec) | Al | Mg | Si | Ni, Ti, Zr, Sr | Others |
| Invention Example | 1 | O | 120 | 11 | 3 | 0.2 | — | — |
| | 2 | O | 10 | 4 | 3 | — | — | — |
| | 3 | O | 20 | 6 | 3 | — | — | — |
| | 4 | O | 50 | 8 | 3 | 0.2 | — | — |
| | 5 | O | 300 | 9 | 3 | 0.2 | — | — |
| | 6 | O | 150 | 13 | 3 | 0.2 | — | — |
| | 7 | O | 50 | 22 | 3 | 0.2 | — | — |
| | 8 | O | 50 | 11 | 1 | 0.2 | — | — |
| | 9 | O | 120 | 11 | 1.5 | 0.2 | — | — |
| | 10 | O | 120 | 11 | 2 | 0.2 | — | — |
| | 11 | O | 120 | 11 | 5 | 0.2 | — | — |
| | 12 | O | 120 | 11 | 6 | 0.2 | — | — |
| | 13 | O | 120 | 11 | 10 | 0.2 | — | — |
| | 14 | O | 120 | 11 | 3 | 0.0001 | — | — |
| | 15 | O | 120 | 11 | 3 | 0.02 | — | — |
| | 16 | O | 120 | 11 | 3 | 0.03 | — | — |
| | 17 | O | 120 | 11 | 3 | 0.8 | — | — |
| | 18 | O | 120 | 11 | 3 | 1 | — | — |
| | 19 | O | 120 | 19 | 3 | 2 | — | — |
| | 20 | O | 120 | 11 | 3 | 0.2 | 0.1 Ni | — |
| | 21 | O | 120 | 11 | 3 | 0.2 | 0.01 Ti | — |
| | 22 | O | 120 | 11 | 3 | 0.2 | 0.01 Sr | — |
| | 23 | O | 120 | 11 | 3 | 0.2 | 0.0001 Zr | — |
| | 24 | O | 120 | 11 | 3 | 0.2 | — | — |
| | 25 | O | 120 | 11 | 3 | 0.2 | — | — |

Underline means outside of range of the present invention.

TABLE 1B

| Classification | No. | Cooling conditions after plating — Holding or staying at constant temperature in temperature range of 365° C. to 380° C. | Retention time or staying time (sec) | Al | Mg | Si | Ni, Ti, Zr, Sr | Others |
|---|---|---|---|---|---|---|---|---|
| Invention Example | 26 | O | 120 | 11 | 3 | 0.2 | — | — |
| | 27 | O | 120 | 11 | 3 | 0.2 | — | 0.01 Sb |
| | 28 | O | 120 | 11 | 3 | 0.2 | — | 0.01 Pb |
| | 29 | O | 120 | 11 | 3 | 0.2 | — | 0.01 Sn |
| | 30 | O | 120 | 11 | 3 | 0.2 | — | 0.01 Ca |
| | 31 | O | 120 | 11 | 3 | 0.2 | — | 0.01 Co |
| | 32 | O | 120 | 11 | 3 | 0.2 | — | 0.01 Mn |
| | 33 | O | 120 | 11 | 3 | 0.2 | — | 0.01 P |
| | 34 | O | 120 | 11 | 3 | 0.2 | — | 0.0001 B |
| | 35 | O | 120 | 11 | 3 | 0.2 | — | 0.01 Bi |
| | 36 | O | 120 | 11 | 3 | 0.2 | — | 0.01 Cr |
| | 37 | O | 120 | 11 | 3 | 0.2 | — | 0.01 Sc |
| | 38 | O | 120 | 11 | 3 | 0.2 | — | 0.01 Y |
| | 39 | O | 120 | 11 | 3 | 0.2 | — | 0.01 REM |
| | 40 | O | 120 | 11 | 3 | 0.2 | — | 0.01 Hf |
| | 41 | O | 120 | 11 | 3 | 0.2 | — | — |
| | 42 | O | 120 | 11 | 3 | 0.2 | — | — |
| | 43 | O | 120 | 11 | 3 | 0.2 | — | — |
| | 44 | O | 120 | 11 | 3 | 0.2 | — | — |
| | 45 | O | 10 | 11 | 3 | 0.2 | — | — |
| | 46 | O | 120 | 11 | 3 | 0.2 | — | — |
| | 47 | O | 75 | 11 | 3 | 0.2 | — | — |
| | 48 | O | 75 | 15 | 4 | 0.2 | — | — |
| | 49 | O | 75 | 19 | 6 | 0.2 | — | — |
| | 50 | O | 75 | 21 | 7 | 0.2 | — | — |
| | 51 | O | 40 | 11 | 3 | 0.2 | — | — |
| | 52 | O | 150 | 11 | 3 | 0.2 | — | — |
| Comparative Example | 1 | O | 120 | <u>3</u> | 3 | — | — | — |
| | 2 | O | 120 | <u>23</u> | 3 | 0.2 | — | — |
| | 3 | O | 120 | <u>11</u> | — | 0.2 | — | — |
| | 4 | O | 120 | 11 | <u>11</u> | 0.2 | — | — |
| | 5 | X | — | 11 | <u>3</u> | 0.2 | — | — |

Underline means outside of range of the present invention.

TABLE 2A

| Classification | No. | Area fraction of Al—Zn mixed structure of plating cross section (%) | Area fraction of second region in Al—Zn mixed structure (%) | Average Zn concentration of first region (mass %) | Average Zn concentration of second region (mass %) | Average Zn concentration of third region (mass %) | Position of nucleation point of Al—Zn mixed structure | Flat surface corrosion resistance | Corrosion resistance after coating |
|---|---|---|---|---|---|---|---|---|---|
| Invention Example | 1 | 55 | 25 | 84 | 71 | 59 | O | A | A |
| | 2 | 10 | 4 | 81 | 69 | — | X | C | C |
| | 3 | 21 | 7 | 82 | 72 | — | O | B | B |
| | 4 | 39 | 15 | 79 | 68 | 60 | O | A | B |
| | 5 | 44 | 25 | 81 | 70 | 65 | O | A | A |
| | 6 | 62 | 20 | 77 | 68 | 59 | O | A | A |
| | 7 | 70 | 40 | 77 | 74 | 56 | X | C | C |
| | 8 | 60 | 15 | 83 | 68 | 61 | X | C | C |
| | 9 | 58 | 20 | 76 | 70 | 63 | O | B | B |
| | 10 | 57 | 16 | 81 | 74 | 60 | O | A | A |
| | 11 | 53 | 23 | 82 | 70 | 62 | O | A | A |
| | 12 | 52 | 27 | 77 | 70 | 65 | O | B | B |
| | 13 | 50 | 36 | 84 | 69 | 66 | X | C | C |
| | 14 | 54 | 24 | 83 | 69 | 64 | O | A | A |
| | 15 | 56 | 20 | 80 | 67 | 65 | O | A | A |
| | 16 | 55 | 10 | 84 | 74 | 63 | O | A | A |
| | 17 | 57 | 26 | 76 | 70 | 61 | O | A | A |
| | 18 | 56 | 15 | 78 | 70 | 65 | O | A | A |
| | 19 | 57 | 26 | 80 | 74 | 64 | O | A | A |
| | 20 | 53 | 15 | 78 | 71 | 59 | O | A | A |
| | 21 | 58 | 17 | 83 | 71 | 57 | O | A | A |
| | 22 | 56 | 16 | 80 | 74 | 58 | O | A | A |
| | 23 | 58 | 20 | 82 | 69 | 59 | O | A | A |
| | 24 | 56 | 29 | 81 | 74 | 65 | O | A | A |
| | 25 | 54 | 23 | 81 | 73 | 63 | O | A | A |

Underline means outside of range of the present invention.

TABLE 2B

| Classification | No. | Area fraction of Al—Zn mixed structure of plating cross section (%) | Area fraction of second region in Al—Zn mixed structure (%) | Average Zn concentration of first region (mass %) | Average Zn concentration of second region (mass %) | Average Zn concentration of third region (mass %) | Position of nucleation point of Al—Zn mixed structure | Flat surface corrosion resistance | Corrosion resistance after coating |
|---|---|---|---|---|---|---|---|---|---|
| Invention Example | 26 | 55 | 15 | 82 | 74 | 60 | O | A | A |
| | 27 | 58 | 16 | 79 | 72 | 66 | O | A | A |
| | 28 | 54 | 21 | 84 | 73 | 59 | O | A | A |
| | 29 | 56 | 14 | 82 | 68 | 60 | O | A | A |
| | 30 | 58 | 18 | 77 | 68 | 60 | O | A | A |
| | 31 | 57 | 25 | 84 | 71 | 61 | O | A | A |
| | 32 | 56 | 26 | 78 | 74 | 55 | O | A | A |
| | 33 | 53 | 22 | 84 | 71 | 57 | O | A | A |
| | 34 | 54 | 19 | 78 | 69 | 57 | O | A | A |
| | 35 | 59 | 12 | 79 | 73 | 57 | O | A | A |
| | 36 | 53 | 23 | 79 | 71 | 66 | O | A | A |
| | 37 | 56 | 15 | 75 | 68 | 66 | O | A | A |
| | 38 | 56 | 26 | 84 | 70 | 56 | O | A | A |
| | 39 | 57 | 27 | 79 | 68 | 56 | O | A | A |
| | 40 | 56 | 21 | 83 | 71 | 56 | O | A | A |
| | 41 | 56 | 0.5 | 84 | 72 | 66 | O | A | A |
| | 42 | 58 | 5 | 81 | 74 | 56 | O | A | A |
| | 43 | 56 | 13 | 77 | 69 | 60 | O | A | A |
| | 44 | 57 | 30 | 80 | 70 | 61 | O | A | A |
| | 45 | 57 | 35 | 82 | 68 | 60 | O | B | B |
| | 46 | 56 | 10 | 84 | 73 | — | O | A | A |
| | 47 | 58 | 23 | 79 | 70 | 59 | O | A | A |
| | 48 | 63 | 29 | 78 | 72 | 62 | O | A | A |
| | 49 | 65 | 32 | 81 | 68 | 61 | O | A | A |
| | 50 | 69 | 33 | 80 | 71 | 64 | O | A | A |
| | 51 | 54 | 35 | 82 | 69 | 60 | O | B | B |
| | 52 | 56 | 10 | 82 | 71 | 62 | O | A | A |
| Comparative Example | 1 | <u>8</u> | — | 77 | — | — | X | D | D |
| | 2 | <u>75</u> | 41 | 84 | 71 | 58 | X | D | D |
| | 3 | <u>60</u> | <u>42</u> | 76 | 73 | 63 | X | D | D |
| | 4 | 40 | <u>50</u> | 82 | 72 | 58 | X | D | D |
| | 5 | 43 | <u>48</u> | 80 | 69 | 61 | X | D | D |

Underline means outside of range of the present invention.

As shown in FIG. 1, a plating layer of Invention Example No. 1 included an (Al—Zn mixed structure) in a matrix of an (Al/Zn/MgZn$_2$ ternary eutectic structure).

Similarly, plating layers of Invention Example Nos. 2 to 52 and Comparative Example Nos. 1 to 5 included an (Al—Zn mixed structure) in a matrix of an (Al/Zn/MgZn$_2$ ternary eutectic structure).

As shown in Tables 1A, 1B, 2A, and 2B, all of hot-dip Zn—Al—Mg-based plated steels of Invention. Example Nos. 1 to 52 satisfy the ranges of the present invention and have good flat surface corrosion resistance and corrosion resistance after coating. In addition, as shown in Table 2, hot-dip Zn—Al—Mg-based plated steels in which the position of the nucleation point of the (Al—Zn mixed structure) is evaluated as "O" have better flat surface corrosion resistance and coating corrosion resistance.

On the other hand, in a hot-dip Zn—Al—Mg-based plated steel of Comparative Example No. 1, the plating layer had a low Al content, an area ratio of the (Al—Zn mixed structure) in the plating layer was low, and a second region was not included in the (Al—Zn mixed structure). For this reason, flat surface corrosion resistance and corrosion resistance after coating were inferior.

In a hot-dip Zn—Al—Mg-based plated steel of Comparative Example No. 2, the plating layer had an excessive Al content, an area ratio of the (Al—Zn mixed structure) in the plating layer was high, and an area ratio of a second region in the (Al—Zn mixed structure) was also high, so that flat surface corrosion resistance and corrosion resistance after coating were inferior.

In a hot-dip Zn—Al—Mg-based plated steel of Comparative Example No. 3, the plating layer did not contain Mg, and an area ratio of a second region in the (Al—Zn mixed structure) was also high, so that flat surface corrosion resistance and corrosion resistance after coating were inferior.

In a hot-dip Zn—Al—Mg-based plated steel of Comparative Example No. 4, the plating layer had an excessive Mg content, and an area ratio of a second region in the (Al—Zn mixed structure) was also high, so that flat surface corrosion resistance and corrosion resistance after coating were inferior.

In a hot-dip Zn—Al—Mg-based plated steel of Comparative Example No. 5, since holding or slow cooling was not performed between 380° C. and 365° C., an area ratio of a second region in the (Al—Zn mixed structure) was high, so that flat surface corrosion resistance and corrosion resistance after coating were inferior.

What is claimed is:

1. A hot-dip Zn—Al—Mg-based plated steel comprising:
a steel; and
a plating layer formed on a surface of the steel,
wherein the plating layer contains, as an average composition, Mg: 1 to 10 mass %, Al: 4 to 22 mass %, and a remainder of Zn and impurities,
the plating layer includes an in Al—Zn mixed structure in an area ratio of 10% to 70% in a cross section of the plating layer in a matrix of an Al/Zn/MgZn$_2$ ternary eutectic structure, the Al—Zn mixed structure includes a first region that has a Zn concentration in a range of 75 mass % or more and less than 85 mass % and a second region that is present inside the first region and has a Zn concentration in a range of 67 mass % or more and less than 75 mass %, and an area ratio of the second region in the Al—Zn mixed structure in the cross section of the plating layer is more than 0% and 40% or less.

2. The hot-dip Zn—Al—Mg-based plated steel according to claim 1, wherein the plating layer contains, as the average composition, Mg: 1 to 10 mass %, Al: 8 to 22 mass %, and a remainder of Zn and impurities, and the Al—Zn mixed structure includes the first region, the second region, and a third region that is present inside the second region and has a Zn concentration in a range of 55 mass % or more and less than 67 mass %.

3. The hot-dip Zn—Al—Mg-based plated steel according to claim 1, wherein the area ratio of the second region in the in Al—Zn mixed structure is 5% to 40%.

4. The hot-dip Zn—Al—Mg-based plated steel according to claim 1, wherein, in a case where the plating layer is halved into a steel side and a plating layer surface side at a ½ position in a plating thickness direction, nucleation points in a number proportion of 60% or more among nucleation points of the Al—Zn mixed structure are present in a region on the steel side of the plating layer.

5. The hot-dip Zn—Al—Mg-based plated steel according to claim 1, wherein the plating layer further contains, as the average composition, 0.0001 to 2 mass % of Si.

6. The hot-dip Zn—Al—Mg-based plated steel according to claim 1, wherein the plating layer further contains, as the average composition, any one or two or more of Ni, Ti, Zr, and Sr in a range of 0.0001 to 2 mass % in total.

7. The hot-dip Zn—Al—Mg-based plated steel according to claim 1, wherein the plating layer further contains, as the average composition, any one or two or more of Sb, Pb, Sn, Ca, Co, Mn, P, B, Bi, Cr, Sc, Y, REM, and Hf in a range of 0.0001 to 2 mass % in total.

8. The hot-dip Zn—Al—Mg-based plated steel according to claim 2, wherein the area ratio of the second region in the Al—Zn mixed structure is 5% to 40%.

9. The hot-dip Zn—Al—Mg-based plated steel according to claim 2, wherein, in a case where the plating layer is halved into a steel side and a plating layer surface side at a ½ position in a plating thickness direction, nucleation points in a number proportion of 60% or more among nucleation points of the Al—Zn mixed structure are present in a region on the steel side of the plating layer.

10. The hot-dip Zn—Al—Mg-based plated steel according to claim 2, wherein the plating layer further contains, as the average composition, 0.0001 to 2 mass % of Si.

11. The hot-dip Zn—Al—Mg-based plated steel according to claim 2, wherein the plating layer further contains, as the average composition, any one or two or more of Ni, Ti, Zr, and Sr in a range of 0.0001 to 2 mass % in total.

12. The hot-dip Zn—Al—Mg-based plated steel according to claim 2, wherein the plating layer further contains, as the average composition, any one or two or more of Sb, Pb, Sn, Ca, Co, Mn, P, B, Bi, Cr, Sc, Y, REM, and Hf in a range of 0.0001 to 2 mass % in total.

* * * * *